(12) United States Patent
Bizzotto et al.

(10) Patent No.: US 10,378,751 B2
(45) Date of Patent: Aug. 13, 2019

(54) HEAT SINK, CORRESPONDING LIGHTING DEVICE AND METHOD OF USE

(71) Applicant: OSRAM GmbH, Munich (DE)

(72) Inventors: Alessandro Bizzotto, Castelfranco Veneto (IT); Marco Munarin, Paese (IT); Nicola Schiccheri, Padua (IT)

(73) Assignee: OSRAM GMBH, Munich (DE)

( * ) Notice: Subject to any disclaimer, the term of this patent is extended or adjusted under 35 U.S.C. 154(b) by 110 days.

(21) Appl. No.: 15/629,811

(22) Filed: Jun. 22, 2017

(65) Prior Publication Data

US 2017/0370552 A1    Dec. 28, 2017

(30) Foreign Application Priority Data

Jun. 23, 2016   (IT) .................. 102016000065261

(51) Int. Cl.
| | |
|---|---|
| B60Q 1/20 | (2006.01) |
| F21V 29/74 | (2015.01) |
| F21S 41/141 | (2018.01) |
| F21V 29/83 | (2015.01) |
| F28F 13/08 | (2006.01) |
| F21S 45/47 | (2018.01) |
| F21S 41/19 | (2018.01) |
| F21S 41/148 | (2018.01) |
| F21Y 115/10 | (2016.01) |
| F21Y 107/90 | (2016.01) |

(52) U.S. Cl.
CPC ............. *F21V 29/74* (2015.01); *B60Q 1/20* (2013.01); *F21S 41/141* (2018.01); *F21S 41/148* (2018.01); *F21S 41/192* (2018.01); *F21S 45/47* (2018.01); *F21V 29/745* (2015.01); *F21V 29/83* (2015.01); *F28F 13/08* (2013.01); *F21Y 2107/90* (2016.08); *F21Y 2115/10* (2016.08)

(58) Field of Classification Search
CPC combination set(s) only.
See application file for complete search history.

(56) References Cited

U.S. PATENT DOCUMENTS

| | | | |
|---|---|---|---|
| 5,002,123 | A | 3/1991 | Nelson et al. |
| 6,533,028 | B2 | 3/2003 | Sato |
| 6,671,172 | B2 | 12/2003 | Carter et al. |
| 7,082,032 | B1 | 7/2006 | Barsun et al. |

(Continued)

FOREIGN PATENT DOCUMENTS

| | | |
|---|---|---|
| DE | 102007017900 A1 | 10/2008 |
| JP | 3134761 U | 8/2007 |
| WO | 2010038982 A2 | 4/2010 |

OTHER PUBLICATIONS

European Search Report based on application No. 17176359.2 (10 pages) dated Nov. 14, 2017 (Reference Purpose Only).

(Continued)

*Primary Examiner* — Evan P Dzierzynski
(74) *Attorney, Agent, or Firm* — Viering Jentschura & Partner MBB

(57) ABSTRACT

Accroding to the present disclosure, a heat sink, which may be used e.g. for LED lamps or bulbs for motor vehicle lights, includes: a plate-like portion extending along an axis with opposed mounting surfaces for at least one heat source, such as e.g. a LED lighting source, and a finned portion thermally coupled with the plate-like portion and including a plurality of annular fins extending around said axis.

12 Claims, 3 Drawing Sheets

(56) References Cited

U.S. PATENT DOCUMENTS

| | | | |
|---|---|---|---|
| 2010/0172091 A1* | 7/2010 | Nishiura | H01L 23/3735 361/689 |
| 2011/0254421 A1* | 10/2011 | Thomas | F21V 23/002 313/46 |
| 2012/0044707 A1* | 2/2012 | Breidenassel | F21V 29/02 362/382 |
| 2014/0055998 A1 | 2/2014 | Haenen et al. | |
| 2014/0055999 A1 | 2/2014 | Haenen et al. | |

OTHER PUBLICATIONS

Italian Search Report based on application No. 102016000065261 (8 pages) dated Mar. 14, 2017 (Reference Purpose Only).

* cited by examiner

HEAT SINK, CORRESPONDING LIGHTING DEVICE AND METHOD OF USE

CROSS-REFERENCE TO RELATED APPLICATION

This application claims priority to Italian Patent Application Serial No. 102016000065261, which was filed Jun. 23, 2016, and is incorporated herein by reference in its entirety.

TECHNICAL FIELD

The description relates to heat sinks, which may find application e.g. in lighting devices.

One or more embodiments may refer to heat sinks for lighting devices which employ electrically-powered light radiation sources such as solid-state light radiation sources, e.g. LED sources.

BACKGROUND

An important issue in the operation of solid-state lighting devices, such as lighting devices employing LED sources, resides in the thermal management of the lighting device.

Performance of LED sources may be widely affected by the temperature reached by the junction in operation. A temperature increase in the junction may lead to a reduction of the luminous flux output from the LED.

The heat generated in operation by a light radiation source such as a LED source may be dissipated via a heat sink, which may be mounted on the rear side of the substrate carrying the source (it may be e.g. a substrate substantially similar to a Printed Circuit Board—PCB). Dissipation may be either active or passive, depending on the presence or absence of a fan or a blower.

In automotive applications, for instance, various heat sink solutions have been proposed.

For example, U.S. Pat. No. 7,082,032 B1 describes a heat sink device comprising a base and a plurality of fins connected to the base, the latter fins extending away from the base at an non-orthogonal angle to the base.

Document U.S. Pat. No. 6,533,028 B2 describes a heat sink having a plurality of fins disposed on a surface of a heat conducting plate, and being non-parallel to the heat receiving surface. An apparatus is also described comprising a heat sink together with a cooling device coupled to the heat sink.

Document U.S. Pat. No. 5,002,123 A describes a fluid heat exchanger for cooling an electronic component. The described solution comprises a plurality of spaced fins connected to the base, such fins being separated by fluid channels, wherein the cross-sectional area of the channels decreases from the inlet to the outlet.

Document U.S. Pat. No. 6,671,172 B2 describes a heat sink comprising a plurality of cooling fins, arranged about a core and coupled to a cooling device. The heat sink fins may have different shapes. According to one solution, the fins are curved. In another solution, the fins are knicked. In still another solution, the fins are both curved and knicked.

SUMMARY

Despite the extensive research and innovation in the field, which emerges e.g. from documents as previously mentioned, the need is still felt for improved solutions.

Attention must be paid e.g. to the automotive sector, e.g. as regards lamps or bulbs to be employed in the so-called retrofit of motor vehicle lamps, i.e. bulbs adapted to replace halogen lamps. This may take place e.g. for front lights (e.g. fog lights) wherein, on the rear side of the bulb, apart from a reflector which may be associated to the lamp itself, a small space may be available. It is therefore desirable to achieve heat exchange structures having a high efficiency, due to the small available space and to the operating temperatures, which may be rather high.

One or more embodiments aim at meeting such need.

According to one or more embodiments, said object may be achieved thanks to a heat sink having the features set forth in the claims that follow.

One or more embodiments may also concern a corresponding lighting device, as well as a corresponding method of use.

The claims are an integral part of the technical description provided herein with reference to the embodiments.

One or more embodiments lead to the achievement of a heat sink adapted to work effectively even in the absence of an additional cooling system, which aims at increasing the velocity of the cooling fluid (e.g. cooling air). One or more embodiments may lead to a velocity increase of such a fluid by tilting the fins and by creating flow channels having a cross-section area which varies in the direction of the velocity vector of the fluid.

BRIEF DESCRIPTION OF THE FIGURES

One or more embodiments will now be described, by way of non-limiting example only, with reference to the annexed Figures, wherein.

Figure 1:
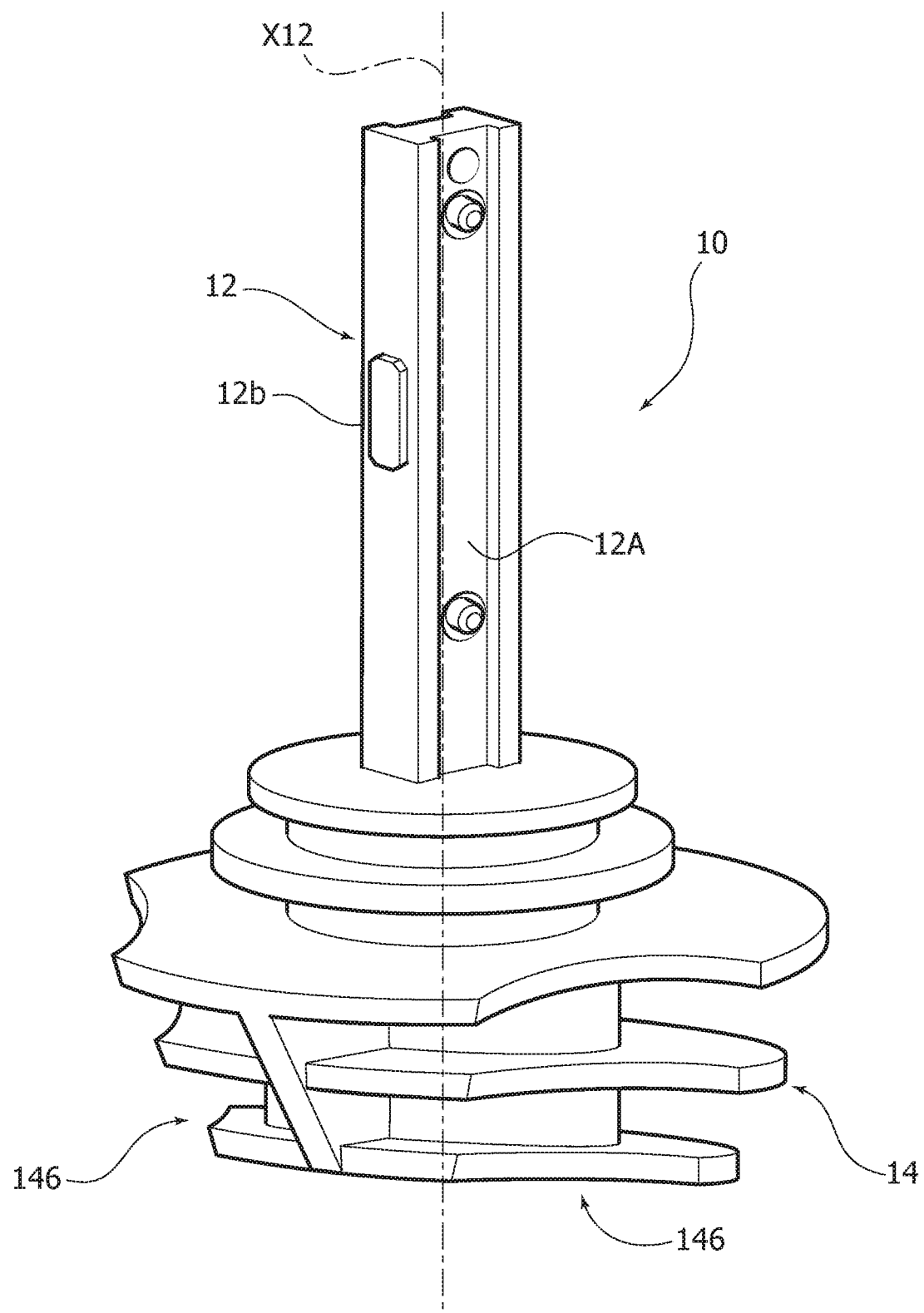
FIG. 1 is an overall perspective view of a heat sink according to one or more embodiments.

It will be appreciated that, for clarity and simplicity of illustration, the various Figures may not be all drawn to the same scale, and may moreover refer to different embodiments.

DETAILED DESCRIPTION

In the following description, various specific details are given to provide a thorough understanding of various exemplary embodiments of the present specification. The embodiments may be practiced without one or several specific details, or with other methods, components, materials, etc. In other instances, well-known structures, materials or operations are not shown or described in detail to avoid obscuring various aspects of the embodiments.

Reference throughout this specification to "one embodiment" or "an embodiment" means that a particular feature, structure, or characteristic described in connection with the embodiment is included in at least one embodiment. Thus, the possible appearances of the phrases "in one embodiment" or "in an embodiment" in various places throughout this specification are not necessarily all referring to the same embodiment. Furthermore, particular features, structures, or characteristics may be combined in any suitable manner in one or more embodiments.

The headings provided herein are for convenience only, and therefore do not interpret the extent of protection or scope of the embodiments.

In one or more embodiments, a heat sink 10 may comprise a shaped body of a thermally conductive material, such as e.g. a metal material or a thermally conductive plastic material.

In one or more embodiments, heat sink 10 may be formed from one piece, or it may comprise a plurality of mutually connected elements or portions being in a thermal coupling relationship, as if they were formed as a single body.

In one or more embodiments, body 10 may include a portion 12, e.g. of a parallelepiped shape, which may include a surface sculpturing, adapted to have an elongated shape and extending along an axis X12.

In one or more embodiments, portion 12 may include two opposed faces or surfaces 12a, 12b, at least one of which may carry, arranged e.g. onto a substrate substantially similar to a Printed Circuit Board (PCB), an electrically powered light radiation source L, which in operation produces heat.

In one or more embodiments, mounting source(s) L onto heat sink 10 may take place according to a method as described in a Patent Application for Industrial Invention filed by the same Applicants on the same date.

In one or more embodiments, the source may be a solid-state light radiation source, e.g. a LED source.

It will be appreciated that the light radiation source(s) L, as well as the corresponding PCB supports, may be elements distinct from the embodiments.

In one or more embodiments, a heat sink 10 as exemplified herein may moreover comprise a finned portion 14, which is thermally coupled (e.g. made from one piece) with portion 12.

In one or more embodiments, finned portion 14 may comprise a plurality of fins 140 (e.g. three fins 140a, 140b, 140c, but said number of fins is obviously not to be construed as limiting the embodiments) having a generally annular shape and extending around longitudinal axis X12.

In one or more embodiments, finned portion 14 may have a hollow structure, and therefore it may be traversed by an axial cavity 142 having, at the end facing towards portion 12, a flute-beak profile adapted e.g. to impart cavity 142 the shape of an axial through cavity along the length of finned portion 14, while providing a sort of cantilever formation 144 at which portion 12 is joined to portion 14 in thermal coupling conditions.

In one or more embodiments, between portion 12 and portion 14 there may be provided an intermediate connecting portion, denoted as 16, having a generally cylindrical shape, with the possible presence (in one or more embodiments: see for example FIG. 1 and FIGS. 2-3) of protrusions/grooves, such as the groove denoted as 160, adapted to form cavities coupling heat sink 10 with an optical element. The latter may be e.g. a reflector R (see the simplified representation of the central part thereof in FIG. 2), adapted to perform a reflection of the light radiation emitted by the light radiation source(s) L in operation.

As stated in the foregoing, one or more embodiments may be used e.g. in order to obtain lighting devices which may be used in the automotive sector, e.g. as retrofit lamps or bulbs which may replace halogen lamps of motor vehicle lamps.

In one or more embodiments, heat sink 10 may support, primarily through finned portion 14, the dissipation of the heat generated in operation by light radiation source(s) L mounted on portion 12.

Such a heat dissipating function may be performed via the fins 140 which are adapted, as previously stated, to comprise a thermally conductive material (e.g. a metal material).

In one or more embodiments, fins 140 may have a generally annular shape, although it is also possible to provide, as exemplified in FIG. 1, notches 146 which may lead to an overall size reduction.

In one or more embodiments, fins 140 may be arranged transversally to axis X12, i.e. approximately orthogonally to axis X12.

Figure 2:
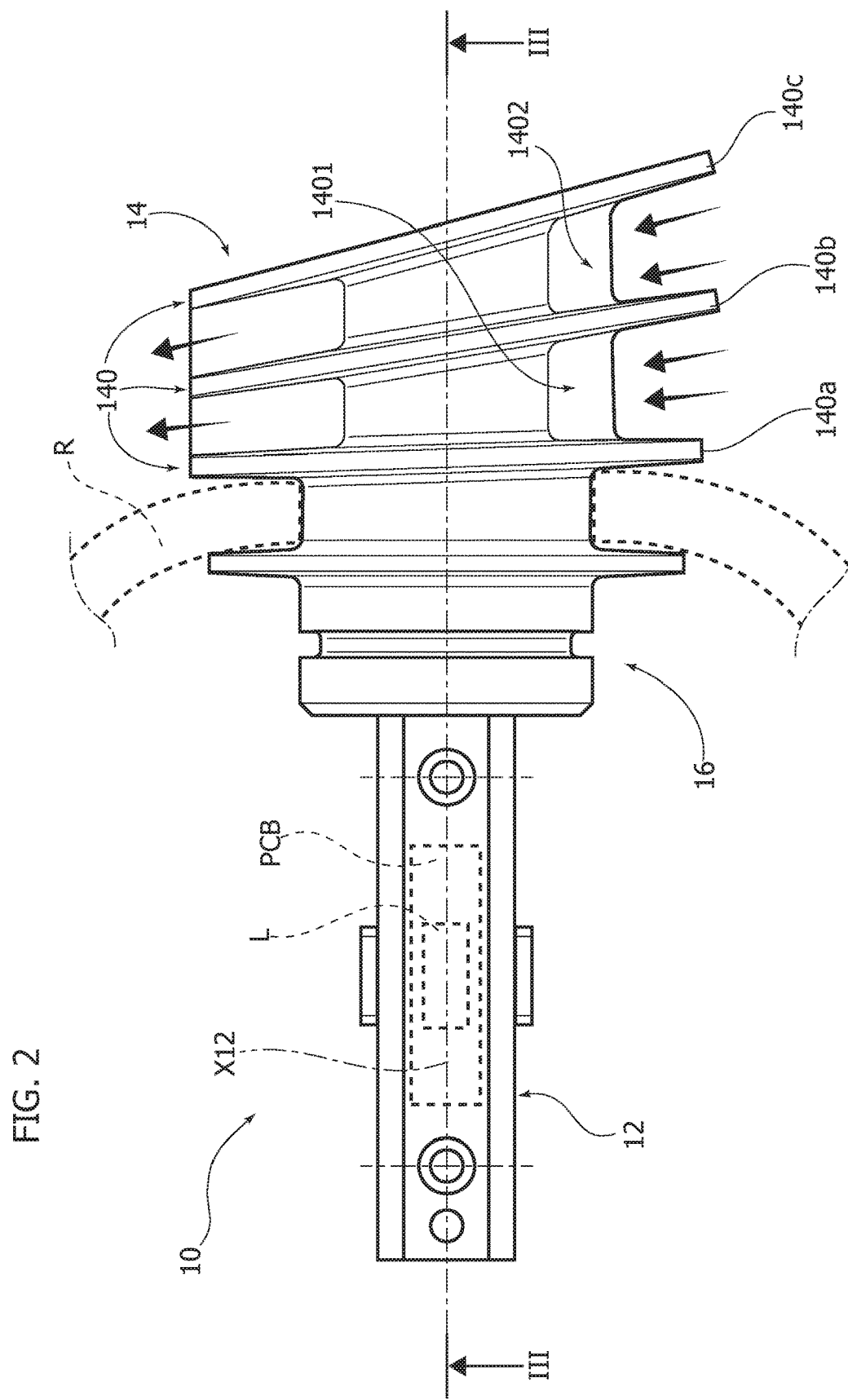
FIG. 2 shows possible methods of use of a heat sink according to one or more embodiments.
Figure 3:
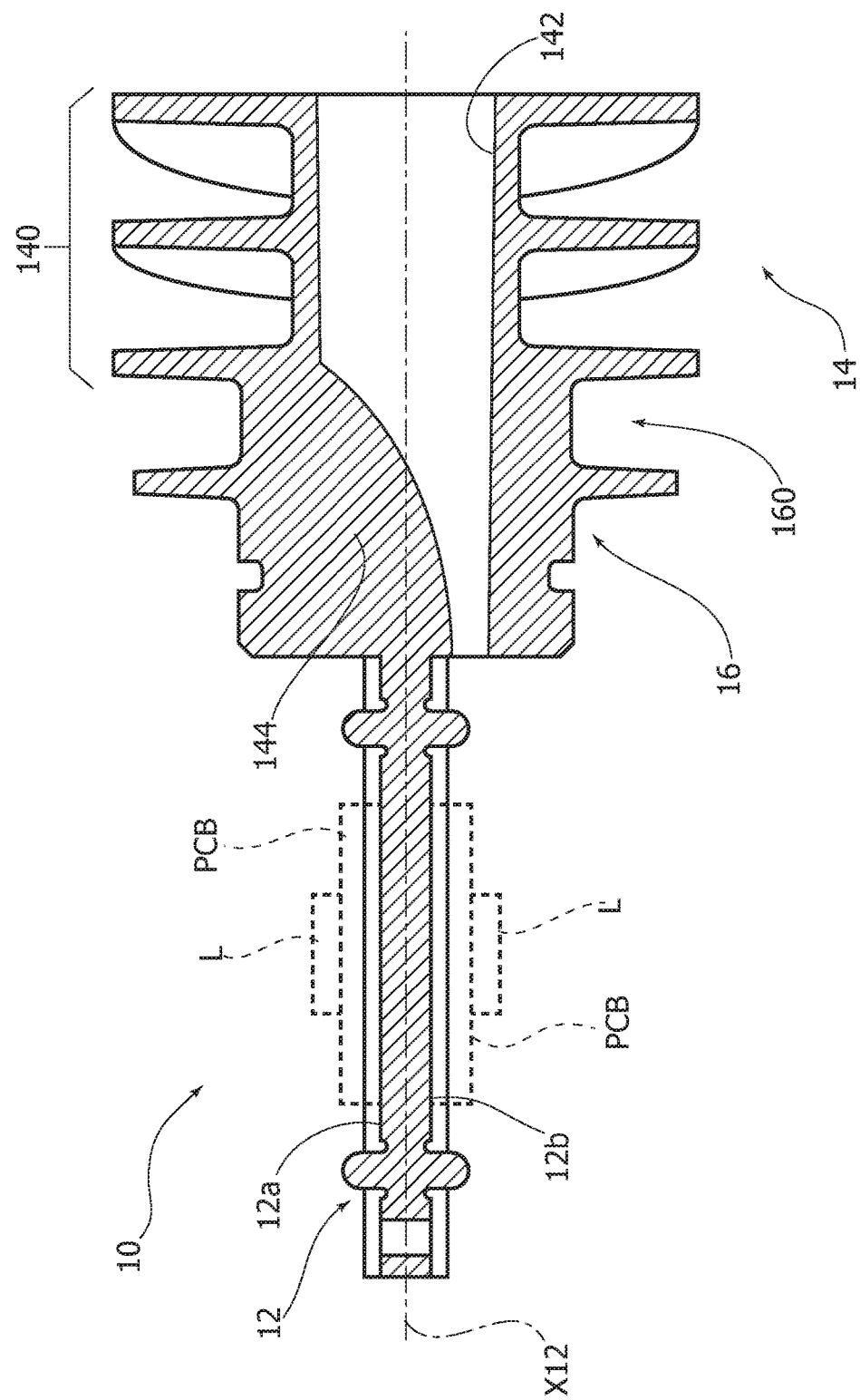
FIG. 3 is a cross-sectional view along line III-III of FIG. 2.

In one or more embodiments, at least some of the fins 140 may however be located obliquely to axis X12, as shown in FIG. 2. The term "obliquely" herein means that at least some of the fins 140 may be neither perpendicular nor parallel to axis X12.

For example, as may be seen in the view of FIG. 2, in one or more embodiments a first fin 140a, closest to portion 12 (e.g. adjoining intermediate portion 16) lies in a plane orthogonal or substantially orthogonal to axis X12.

On the contrary, the following fins 140b, 140c etc., i.e. the fins which are located farther from portion 12, lie in planes which are oblique (tilted) to the plane orthogonal to axis X12.

In one or more embodiments, said subsequent fins 140b, 140c are parallel to each other, i.e. with the respective lying planes having the same tilting angle with respect to axis X12.

In one or more embodiments as exemplified herein, said following fins 140b, 140c may be in turn oblique to one another, i.e. with the respective lying planes having different tilting angles to axis X12, e.g. with a tilting angle that increases with the distance from portions 12 and 16.

In one or more embodiments as exemplified herein fins 140 may have a generally planar shape.

In one or more embodiments, however, while keeping a generally annular structure, they may have a curved shape, such finned being ideally produced by a generating line which, instead of planar, may be curved, such as an exponential or a spline.

Also independently from the specific implementation details which have been previously mentioned, in one or more embodiments the purpose may be achieved of having pairs of fins 140 respectively define air flow channels (e.g. a first channel 1401, between fins 140a and 140b, and a second channel 1402 between fins 140b and 140c).

In one or more embodiments, such channels 1401, 1402 may have a width which varies (e.g. decreases) monotonously in a diametral direction with respect to the extension of fins 140 themselves.

For example, FIG. 2 shows that channels 1401, 1402 may have a tapered shape, e.g. with air inflow ends, at the bottom of the Figure, being wider than air outflow ends, at the top of the Figure.

Despite the presence of such variable width, fins may be implemented so that the flow of fluid passing in the channel (e.g. 1401, 1402) defined between two adjoining fins 140 is constant along the channel; in other words, the tilting and the shape of fins 140 are defined so that the fluid velocity along the channel increases through the various sections of the fluid flow channel.

One or more embodiments implement the operation method exemplified in FIG. 2.

Such operation may find application e.g. in a lamp, e.g. a light of a vehicle such as a motor vehicle.

In this operating mode, heat sink 10 (or more generally the lighting device comprising heat sink 10 and the light radiation source(s) L mounted thereon) may be have axis X12 oriented horizontally and opposed surfaces 12a, 12b of portion 12 oriented vertically.

In this situation, flow channels 1401, 1402 of cooling fluid (e.g. ventilation air) are oriented vertically, their "wider" ends facing downwards and their "narrower" ends facing upwards.

In these conditions, a heat exchange mechanism may be achieved whereby, when ventilation air passes in channels 1401, 1402 (which may also be present in a different number from the two channels exemplified herein), it is adapted to remove the heat from heat sink 10, the air temperature being lowest at the lower extremities of fins 140 (see the four arrows at the bottom in FIG. 2), where the channels 1401, 1402 exhibit their maximum width, and increasing while proceeding upwards, where the width of channels 1401, 1402 becomes smaller (see the two arrows at the top of FIG. 2).

In this way, the velocity of ventilation air may increase during the transition between the fins, because the area of the conduct decreases while the fluid temperature increases.

In this way, fins 140 originate a movement resembling that of a blower or fan, so as to increase the efficiency of the heat exchange system. This is true also if light radiation source(s) L operate within static or nearly static air (e.g. within reflector R) and without the need of an additional cooling system.

In comparison with conventional solutions, e.g. the solution according to U.S. Pat. No. 5,002,123 A (wherein the heat source is located on a base plate, the fins being connected orthogonally to said base plate), or the solution according to U.S. Pat. No. 6,671,172 B2 (wherein the heat sources are located on a surface of a massive metal core, wherefrom the fins depart, subsequently growing in a radial direction), in one or more embodiments the heat source(s) (light radiation sources L) may be placed onto a generally plane plate structure (portion 12) arranged in a heat transfer relationship with finned portion 14, in conditions wherein fins 140 are arranged transversally to base plate 12.

In this way an array of fins 140 may be obtained which is adapted to originate a mechanism which gradually reduces temperature, by creating a gradient of temperature from fin 140a closest to heat source (light radiation source(s) L) towards fins 140b, 140c, i.e. proceeding towards the fins 140 which are farther away from portion 12.

This enables arranging the heat source very close to (i.e., virtually contacting) the adjoining heat-sensitive parts, thus achieving a more compact heat sink.

For example, in one or more embodiments the lateral dimensions of base plate 12 are not influenced by the number of fins connected to the base: in one or more embodiments, the number of fins 140 is practically independent from the size of portion 12, because fins 140 are oriented transversally to axis X12.

One or more embodiments may therefore concern a heat sink (e.g. 10), comprising:
- a plate-like portion (e.g. 12) extending along an axis (e.g. X12) with opposed surfaces (e.g. 12a, 12b) for mounting at least one heat source (e.g. L), and
- a finned portion (e.g. 14) thermally coupled with the plate-like portion and comprising a plurality of annular fins (e.g. 140) extending around said axis.

One or more embodiments may comprise a cylindrical portion (e.g. 16) arranged around said axis, between said plate-like portion and said finned portion.

In one or more embodiments, said plurality of fins may comprise at least one fin (e.g. 140a) extending orthogonally to said axis.

In one or more embodiments, said at least one fin may be arranged at the end of said plurality of fins, facing towards said plate-like portion.

In one or more embodiments, said plurality of fins may comprise at least one fin (e.g. 140b, 140c) which is oblique (i.e. neither orthogonal nor parallel) to said axis.

In one or more embodiments, said plurality of fins may comprise more than one fin oblique to said axis.

In one or more embodiments, said plurality of fins oblique to said axis are oblique to one another.

One or more embodiments may include tapered fluid flow channels (e.g. 1401, 1402), extending between the fins of said plurality of fins, said tapered channels extending between a first side (e.g. at the bottom of FIG. 2) and a second side (e.g. at the top of FIG. 2) of the finned portion, said first and second sides being opposed to each other in a diametral direction with respect to said finned portion, wherein said tapered channels have wider fluid inflow ends (e.g. arrows at the bottom of FIG. 2, in the position corresponding to said first side of the finned portion), and narrower fluid outflow ends (e.g. arrows at the top of FIG. 2) in the position corresponding to said second side of the finned portion.

The reference to relatively wider and narrower ends denotes the tapering direction of channels (e.g. 1401, 1402), with:
- fluid inflow ends being wider than fluid outflow ends, and
- fluid outflow ends being narrower than fluid inflow ends.

In one or more embodiments, said plate-like portion may extend parallel to said diametral direction (e.g. in the plane of the drawing of FIG. 2).

In one or more embodiments, a lighting device may comprise:
- a heat sink according to one or more embodiments, and
- an electrically-powered light radiation source, optionally a LED source, adapted to constitute said heat source mounted on at least one of said opposed surfaces of the plate-like portion.

A method of using a heat sink or a lighting device according to one or more embodiments may comprise arranging said heat sink with said axis oriented horizontally and said plate-like portion oriented vertically, optionally with said second side of the finned portion, wherein the fluid outflow ends may be located, arranged above said first side of finned portion, where the fluid inflow ends may be located.

Without prejudice to the basic principles, the details and the embodiments may vary, even appreciably, with respect to what has been described herein by way of non-limiting example only, without departing from the extent of protection.

The extent of protection is defined by the annexed claims.

The invention claimed is:

1. A heat sink, including:
   a plate-like portion extending along an axis and having opposed mounting surfaces for at least one heat source,
   a finned portion thermally coupled with the plate-like portion and including a plurality of annular fins extending around said axis, and
   tapered fluid flow channels between the fins of said plurality of annular fins, said tapered fluid flow channels extending between first and second sides of the finned portion, said first and second sides opposed in a diametral direction of said finned portion, wherein said tapered fluid flow channels have wider fluid inflow ends at said first side of the finned portion and narrower fluid outflow ends at said second side of the finned portion.

2. The heat sink of claim 1, including a cylindrical portion arranged around said axis between said plate-like portion and said finned portion.

3. The heat sink of claim 1, wherein said plurality of annular fins include at least one fin extending orthogonal to said axis.

4. The heat sink of claim 3, wherein said at least one fin is located at the end of said plurality of the annular fins facing towards said plate-like portion.

5. The heat sink of claim 1, wherein said plurality of annular fins include at least one fin oblique to said axis.

6. The heat sink of claim 5, wherein said plurality of annular fins include plural fins oblique to said axis.

7. The heat sink of claim 6, wherein said plural fins oblique to said axis are oblique to one another.

8. The heat sink of claim 1, wherein said plate-like portion extends parallel to said diametral direction.

9. A lighting device, including:
   a heat sink, wherein the heat sink includes,
      a plate-like portion extending along an axis and having opposed mounting surfaces for at least one heat source,
      a finned portion thermally coupled with the plate-like portion and including a plurality of annular fins extending around said axis, and
      tapered fluid flow channels between the fins of said plurality of annular fins, said tapered fluid flow channels extending between first and second sides of the finned portion, said first and second sides opposed in a diametral direction of said finned portion, wherein said tapered fluid flow channels have wider fluid inflow ends at said first side of the finned portion and narrower fluid outflow ends at said second side of the finned portion,
   the lighting device further including an electrically powered light radiation source, mounted at least one of said opposed surfaces of the plate-like portion.

10. The lighting device of claim 9, wherein the electrically powered light radiation source is a LED source.

11. A method of using a heat sink, wherein the heat sink includes,
   a plate-like portion extending along an axis and having opposed mounting surfaces for at least one heat source,
   a finned portion thermally coupled with the plate-like portion and including a plurality of annular fins extending around said axis, and
   tapered fluid flow channels between the fins of said plurality of annular fins, said tapered fluid flow channels extending between first and second sides of the finned portion, said first and second sides opposed in a diametral direction of said finned portion, wherein said tapered fluid flow channels have wider fluid inflow ends at said first side of the finned portion and narrower fluid outflow ends at said second side of the finned portion,
   the method including,
   arranging said heat sink with said axis arranged horizontally and said plate-like portion arranged vertically, and
   arranging said heat sink with said second side of the finned portion arranged above said first side of the finned portion.

12. A method of using a lighting device, wherein the lighting device includes,
   a heat sink, wherein the heat sink includes a plate-like portion extending along an axis and having opposed mounting surfaces for at least one heat source, a finned portion thermally coupled with the plate-like portion and including a plurality of annular fins extending around said axis, and tapered fluid flow channels between the fins of said plurality of annular fins, said tapered fluid flow channels extending between first and second sides of the finned portion, said first and second sides opposed in a diametral direction of said finned portion, wherein said tapered fluid flow channels have wider fluid inflow ends at said first side of the finned portion and narrower fluid outflow ends at said second side of the finned portion, wherein said plate-like portion extends parallel to said diametral direction, and
   an electrically powered light radiation source mounted at least one of said opposed surfaces of the plate-like portion,
   the method including,
   arranging said heat sink with said axis arranged horizontally and said plate-like portion arranged vertically, and
   arranging said heat sink with said second side of the finned portion arranged above said first side of the finned portion.

* * * * *